US006259552B1

(12) United States Patent
Boffi et al.

(10) Patent No.: US 6,259,552 B1
(45) Date of Patent: Jul. 10, 2001

(54) OPTICAL WAVELENGTH CONVERTER

(75) Inventors: Pierpaolo Boffi, Voghera; Lucia Marazzi, Pavia; Mario Martinelli, S. Donato Milanese, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/564,500

(22) Filed: May 4, 2000

Related U.S. Application Data

(63) Continuation of application No. PCT/EP98/06970, filed on Nov. 5, 1998.
(60) Provisional application No. 60/065,060, filed on Nov. 10, 1997.

(30) Foreign Application Priority Data

Nov. 5, 1997  (EP) .................................................. 97119344

(51) Int. Cl.[7] ...................................................... G02F 1/365
(52) U.S. Cl. .............................. 359/332; 359/326; 385/24
(58) Field of Search ................................. 359/326–332, 359/258; 385/11, 15, 24, 1, 2

(56) References Cited

U.S. PATENT DOCUMENTS

| | | | |
|---|---|---|---|
| 5,111,326 | 5/1992 | Ball ...................................... | 359/244 |
| 5,267,073 | 11/1993 | Tamburello et al. ................. | 359/179 |
| 5,619,368 | 4/1997 | Swanson .............................. | 359/326 |
| 5,625,479 | 4/1997 | Suzuki et al. ........................ | 359/135 |
| 5,828,484 | * 10/1998 | Ho et al. .............................. | 359/258 |
| 5,960,146 | * 9/1999 | Okuno et al. ..................... | 359/332 X |

FOREIGN PATENT DOCUMENTS

| | | |
|---|---|---|
| 0 687 939 | 12/1995 | (EP) . |
| 0 717 482 | 6/1996 | (EP) . |
| 0 788 017 | 8/1997 | (EP) . |

OTHER PUBLICATIONS

G.R. Williams et al., "Soliton Logic Gate Using Low–Birefringence Fiber in a Monlinear Loop Mirror", Optics Letters, vol. 20, No. 16, pp. 1671–1673, (Aug. 1995).
H.K. Lee et al., "A Walk–Off Balanced Nonlinear Fiber Loop Mirror Switch", IEEE Photonics Technology Letters, vol. 7, No. 12, pp. 1441–1443, (Dec. 1995).
P. Boffi et al., "Analysis of the Kerr Phase–Shift Induced by Optically Amplified Transmission Signals", Optics Communications, vol. 129, No. 1, pp. 152–160, (Aug. 1996).
S.J.B. Yoo, "Wavelength Conversion Technologies for WDM Network Applications", Journal of Lightwave Technology, vol. 14, No. 6, pp. 955–966, (Jun. 1996).
T. Durhuus, et al., "All–Optical Wavelength Conversion by Semiconductor Optical Amplifiers", Journal of Lightwave Technology, vol. 14, No. 6, (Jun. 1996), pp. 942–954.
F. Ratovelomanana et al., "An All–Optical Wavelength–Converter with Semiconductor Optical Amplifiers Monolithically Integrated in an Asymmetric Passive Mach–Zehnder Interferometer", IEEE Photonics Technology Letters, vol. 7, No. 10, pp. 992–994, (Oct. 1995).
L.B. Jeunhomme, "Single–Mode Fiber Optics", Marcel Dekker Inc., Chapter 2, pp. 60–95, (1990).

* cited by examiner

*Primary Examiner*—John D. Lee
(74) *Attorney, Agent, or Firm*—Finnegan, Henderson, Farabow, Garrett & Dunner, L.L.P.

(57) ABSTRACT

There is provided an optical wavelength converter which allows the rapid and efficient shifting of information modulated on a light signal of one wavelength to a light signal of a second wavelength without the negative effects of noise and other disturbances which have proven to be problems in the prior art. The device splits a CW probe signal of a first wavelength into two components, which propagate with opposite orientations through a Kerr leg. Also propagating in the Kerr leg is a modulated drive signal at a second wavelength. These signals interact in the Kerr leg, and are recombined at an output coupler so as to create interference between the two probe components. An intensity modulated probe signal is output.

7 Claims, 8 Drawing Sheets

OPTICAL WAVELENGTH CONVERTER

This application is a continuation of International Application No. PCT/EP98/06970, filed Nov. 5, 1998, the content of which is incorporated herein by reference and claims the benefit of U.S. Provisional Application No. 60/065,060, filed Nov. 10, 1997.

FIELD OF THE INVENTION

The present invention relates to optical wavelength converters, and more specifically to a device which allows the rapid and efficient shifting of information modulated on a light signal of one wavelength to a light signal of a second wavelength without the negative effects of noise and other disturbances which have proven to be problems in the prior art.

BACKGROUND OF THE INVENTION

Fiber-based optical communication systems have rapidly increased in importance in recent years. The ability to transmit large volumes of information over optical fibers has resulted in increasing demands for systems which can take advantage of the bandwidth available in optical communications systems. One problem in the art which has been recognized and partially addressed in the past is the need to efficiently shift the wavelength of optical signals used to carry information. Wavelength shifters are often required when a signal is to be routed to a subnetwork existing within a larger network, and for various types of optical processing.

A variety of optical wavelength conversion techniques have been proposed, but each presents one or more problems. A review of the known techniques is given in a paper by S. J. B. Yoo, Journal of Lightwave Technology, vol. 14, n. 6, June 1996, pag. 955–966.

Some systems use optical/electrical solutions, such as electrically detecting the information carried by a first optical signal and then modulating a second laser signal using the information contained in the first signal. This is disclosed, for example, in U.S. Pat. No. 5,267,073 (Grasso et al.). This technique is inherently limited by the speed of the associated electronics, and may be not transparent to bit rate.

Other systems use cross-gain modulation (XGM) or cross-phase modulation (XPM) in semiconductor optical amplifiers (SOA). These techniques are described, e.g., in a paper by T. Durhuus et al., Journal of Lightwave Technology, vol. 14, n. 6, June 1996 pag. 942–954 or, e.g., in the paper "An All-Optical Wavelength-Converter with Semiconductor Optical Amplifiers Monolithically Integrated in an Asymmetric Passive Mach-Zehnder Interferometer", IEEE Photonics Technology Letters, Vol. 7, No. 10, October 1995. A semiconductor interferometric optical wavelength conversion technique is described in EP 717,482 (AT&T). Wavelength converters employing SOAs are limited, among others, in the operational bit rates and in their noise performances.

Another known technique for wavelength conversion exploits four wave mixing of an input signal and a pump signal in a nonlinear medium to produce a conjugate signal to the input signal, wherein the conjugate signal is at a frequency shifted from that of the input signal. This technique is illustrated and discussed, for example, in U.S. Pat. No. 5,619,368. In an embodiment, a pump signal and an input signal co-propagate in both a clockwise and a counterclockwise direction in a nonlinear optical medium, such as an optical fiber loop mirror, in order to generate the output signal of interest. The clockwise and counter-clockwise components of both the injected input signal and pump signal are phase matched in the mirror loop by appropriate choice of fiber length, fiber dispersion zero and frequency separation.

EP 697 939 discloses a wavelength converter comprising a nonlinear optical device having a first input for a constant light of a first wavelength $\lambda_s$, a second input for a second signal of a second wavelength $\lambda_p$, modulated with an information, and a first output for a signal of the first wavelength $\lambda_s$ which is modulated by said information. The nonlinear optical device can comprise one of the following: a nonlinear fiber optic Mach-Zehnder interferometer, a nonlinear optical loop mirror, or a nonlinear fiber optic directional coupler.

Wavelength converters employing a nonlinear optical loop mirror are discussed in the above cited paper by S. J. B. Yoo. In FIG. 6(b) a nonlinear optical loop mirror using an optical fiber as a nonlinear medium is shown. A probe beam is split in two by a 50:50 fiber coupler and propagates in both directions. In the absence of nonlinear interaction, the output port sees no probe beam. An input signal is coupled into the loop via a fiber coupler and propagates in a counter-clockwise direction. This signal modulates the optical index of the nonlinear optical fiber owing to an optical Kerr effect, and causes the phase of the probe beam propagating counter-clockwise to increase relative to that of the clockwise beam. Due to this asymmetry, the output port sees the probe beam. Due to a finite propagation time through the nonlinear element, the probe signal is pulsed (clock) and needs synchronization with the input signal. All-fiber systems require more than 2 km of optical fibers, and unstable output can be caused due to local index variations in the fiber.

U.S. Pat. No. 5,111,326 discloses an integrated Kerr shutter and a high speed modulated optical source. A pulsed pump signal changes the polarization of a CW probe signal in a polarization maintaining fiber by the optical Kerr effect. The probe signal is decoupled at the output end of the polarization maintaining fiber and passed through an analyzer yielding an output probe signal having a wavelength of the probe signal and a pulse rate of the pump signal.

A paper by H. K. Lee et al., IEEE Photonics Technology Letters, Vol. 7, No. 12, December 1995, pp. 1441–1443, discloses a walk-off balanced nonlinear fiber loop mirror-type all-optical switch for 10 Gb/s signals of 1.3 $\mu$m wavelength with 1.5 $\mu$m control pulses. The disclosed nonlinear fiber loop mirror is composed of three fiber couplers and a 500-m-long polarization maintaining fiber. The signal source is a gain-switched laser diode emitting at 1.313 $\mu$m. The source pulses are interleaved to produce a 10 GHz pulse train, split by a fiber coupler and then introduced in opposite directions into the nonlinear fiber loop mirror. The control beam is generated from a pulsed 1.535 $\mu$m DFB laser, whose pulses are amplified and compressed. The control beam is then split into two by a 3-dB coupler and coupled into the nonlinear fiber loop mirror in directions counterpropagating to each other. One of the control beams is delayed by a variable fiber delay line with respect to the other control beam. The switching window size is controllable by controlling the relative timing delay between the two counter-propagating control beams.

A paper by G. R. Williams et al, Optics Letters, Vol. 10, No. 16, August 1995, pp. 1671–1673, discloses a soliton logic gate using a low birefringence fiber in a nonlinear loop mirror.

SUMMARY OF THE INVENTION

The inventors have developed a wavelength converter which is capable of transferring information in terms of intensity modulation from an optical beam at a first wavelength to another optical beam at a second wavelength, wherein the second wavelength is variable and may be chosen by the operator.

The wavelength converter is based on the Kerr effect induced by the beam at the first wavelength on the beam at the second wavelength during common propagation in an optical nonlinear medium (defined in the following as "Kerr leg"), such as an optical fiber.

Applicants have found that the information contained in a first signal can be transferred to a second signal by propagating two portions of the second signal in opposite orientations through a nonlinear optical medium whose optical characteristics are modulated by said first signal and causing interference of said two portions.

This new technique is transparent to bit rate changes, works well at very high bit rates, is insensitive to environmental noise and allows a high flexibility in the choice of the input and output wavelengths. Furthermore, a CW source at the second wavelength can be used, and no synchronization is needed between the input signal and the beam source at the second wavelength.

In accordance with the teachings contained herein, the present invention provides, in a first aspect, a wavelength converter for transferring information from a first signal of one wavelength to a second signal of a second wavelength, comprising an optical path formed by a length of optical fiber which contains a Kerr leg, a first optical coupler for receiving a first optical signal and splitting that signal into two components, so that one component travels in a first direction around the optical path and a second component travels in a second direction around the optical path, opposite to the first direction. The wavelength converter further comprises a second optical coupler for receiving a second optical signal which is intensity modulated with information and supplying that signal to the optical path in one of said first or second direction, so that the second optical signal and the first and second components of the first optical signal interact in the Kerr leg of the optical path, third and fourth optical couplers for coupling the optical signals moving in the optical path to a first and second output optical path, respectively and an output coupler for combining the two components of the first optical signal and generating an output optical signal which has the wavelength of the first optical signal and is intensity modulated with the information contained in the second optical signal.

In a further aspect the present invention also provides a method for transferring information from one optical signal to a second optical signal by splitting the second signal into two portions and causing the two portions to travel in opposite directions through an optical path containing a Kerr leg, causing the first signal to travel in one of said opposite directions through the optical path containing the Kerr leg, coupling the two portions of the second signal out of the optical path along a second and a third optical path, and combining the two portions of the second signal along the second and third optical path to create interference between them.

According to yet another aspect, the present invention provides an optical telecommunication system comprising a transmitter for generating a first optical signal at a first wavelength which is intensity modulated with information; a first optical link operating at said first wavelength, coupled to said transmitter; a second optical link operating at a second wavelength; a wavelength converter connecting said first and second optical links, wherein said wavelength converter comprises: an optical path formed by a length of optical fiber which contains a Kerr leg; a first optical coupler for receiving a second optical signal at said second wavelength and splitting that signal into two components, so that one component travels in a first direction around the optical path and a second component travels in a second direction around the optical path, opposite to the first direction; a second optical coupler for receiving said first signal and supplying it to the optical path in one of said first or second direction, so that the first optical signal and the first and second components of the second optical signal interact in the Kerr leg of the optical path; third and fourth optical couplers for coupling the optical signals moving in the optical path to a first and second output optical path, respectively, and an output coupler for combining the two components of the second optical signal, generating an output optical signal which has the second wavelength and is intensity modulated with the information contained in the first optical signal, and for coupling said output optical signal to said second optical link.

DESCRIPTION OF THE PREFERRED EMBODIMENTS

Figure 1:
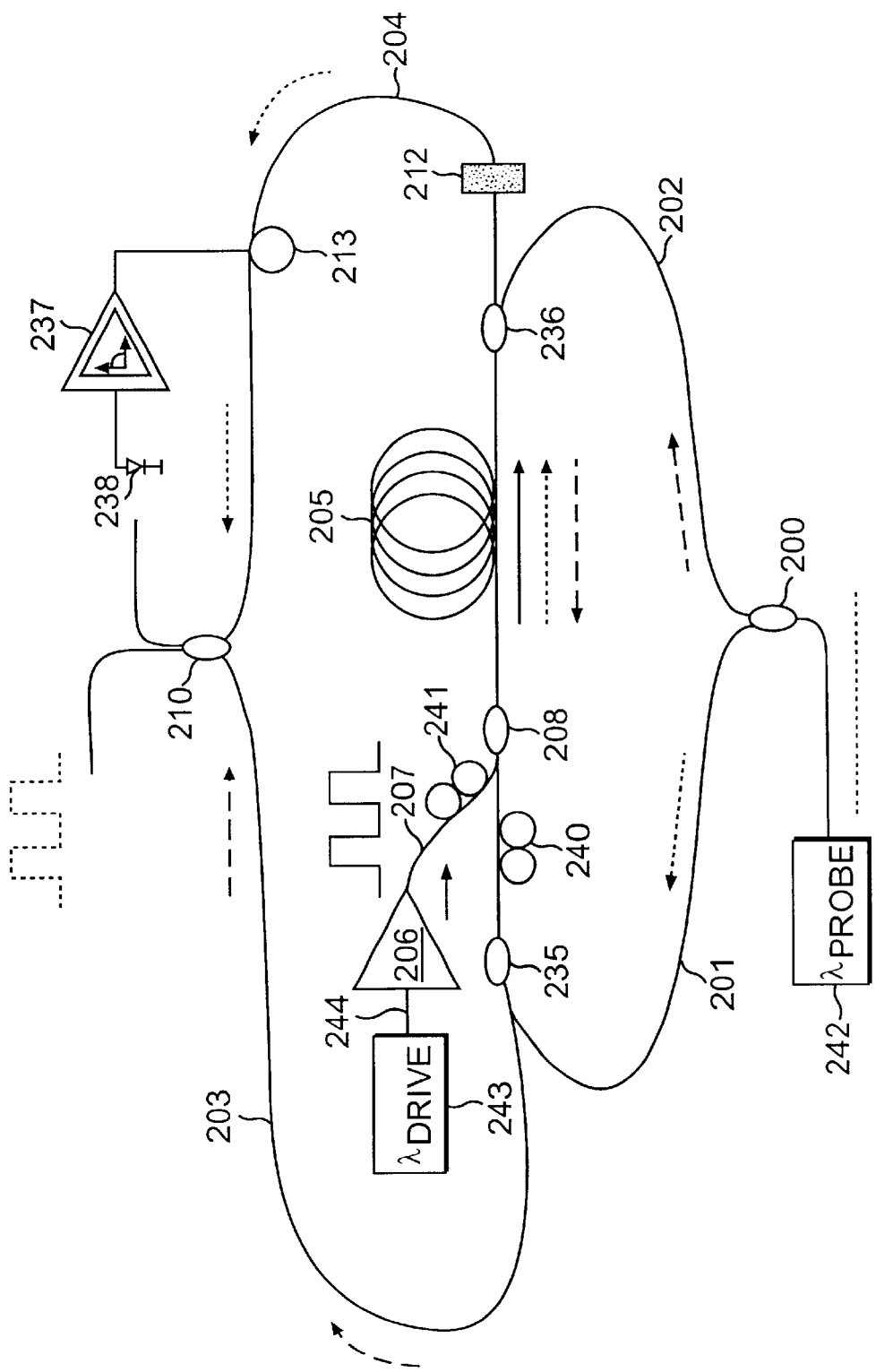
FIG. 1 is a diagram of the optical frequency shifter of the present invention.

The invention will be described with reference to the attached drawings. The layout of the wavelength converter is shown in FIG. 1. A first CW optical beam with a wavelength $\lambda_{probe}$, referred to herein as the "input probe" beam, generated by an optical source 242 is input into a first coupler 200. This coupler 200 is located at the input of interferometer branches 201, 202 which share a common optical nonlinear path 205, called the "Kerr leg", of length L. The length L may be chosen based on the design needs of the system in which the converter will be used, as explained below. Coupler 200 splits the probe beam between the two paths 201, 202 leading to the Kerr leg. Optical paths 201, 202 are, for example, optical fibers or optical waveguides. A second optical beam, at a wavelength $\lambda_{drive}$, referred to herein as the "drive" beam, generated by a source 243, is supplied by an optical path 244 to and amplified in an optical amplifier 206, e.g., an EDFA (Erbium Doped Fiber Amplifier) and is coupled in the Kerr leg via a fiber 207, a polarization controller 241 and a second coupler 208. The drive beam is intensity modulated at a modulation frequency $f_m$. The modulation of the drive beam is preferably digital. The optical path 244 can be an optical fiber, a telecommunication line or a path in an optical network.

A 3 dB coupler 208 has been used in the test setup illustrated in FIG. 1. A coupler with an unequal coupling ratio may be used instead, e.g., a 90/10 coupler, in order to save drive power and correspondingly increase the non linear effect in the Kerr leg.

A wavelength independent coupler, or a coupler with a limited wavelength dependence can be used for coupler 208 to allow for use of tunable sources for either the probe or drive signals, or both, without the need of controlling tuning of the coupler.

A dichroic coupler, for example a fused fiber WDM coupler, or one based on interferential filters or fiber Bragg gratings, can be used as coupler 208 to achieve a higher coupling ratio, though at the expense of a more limited tunability. A dichroic coupler is preferably used whenever the resulting tunability for $\lambda_{probe}$ and $\lambda_{drive}$ fulfills system requirements and if $\lambda_{probe}$ and $\lambda_{drive}$ are not too closely spaced, so that the coupler is effective in coupling them.

A tunable wavelength selective coupler can also be used for coupler 208, to achieve both a high coupling ratio and tunability of the whole wavelength converter. An example is an acousto-optic wavelength selective switch.

Part of the probe beam, split by coupler 200, copropagates through the Kerr leg 205 with the amplified drive beam, while the remaining part of the probe beam counter propagates with respect to the drive beam. The amplified drive beam propagates in a direction which corresponds to the direction of one part of the probe signal, and is opposite to the other part of the probe signal. The polarization of the copropagating probe beam is made equal to the polarization of the drive beam entering the Kerr leg, by a polarization controller 240 connected before coupler 208. Polarization controllers can be omitted, for example, if polarization maintaining components, such as couplers, optical fibers or waveguides are used for the optical paths in the wavelength converter, including the Kerr leg. The two probe fractions are separated at couplers 235, 236 on each side of the Kerr leg, follow optical paths 203, 204, respectively, and are mixed at interference coupler 210. Optical paths 203, 204 are, for example, optical fibers or optical waveguides. Optical interference between the two probe fractions is obtained at the output of the coupler 210. A filter 212 is located at the output of coupler 236 to suppress the drive beam and prevent its interference with the probe components at coupler 210.

The optical path followed by one of the two probe beam fractions in the interferometer (first interferometer path, or arm) comprises coupler 200, path 201, coupler 235, polarization controller 240, coupler 208, Kerr leg 205, coupler 236, filter 212, path 204 and coupler 210. The remaining probe beam fraction follows a second interferometer path, or arm, comprising coupler 200, path 202, coupler 236, Kerr leg 205, coupler 208, polarization controller 240, coupler 235, path 203 and coupler 210. The two interferometer paths have a common portion, comprising the Kerr leg.

Special care is preferably taken to have a high output extinction ratio and to obtain the maximum contrast at the output of interference coupler 210. This is achieved by equalizing the intensity of the two probe beam fractions interfering in interference coupler 210 and by operating the interferometer in quadrature.

An equal intensity of the two interfering probe beam fractions can be achieved by using 3 dB (50/50) couplers for couplers 200 and 210. Also, the splitting ratio of couplers 235, 236 are advantageously equal to each other. In alternative, optical circulators can be used for couplers 235, 236, to save probe beam power. More in general, it is preferred to have equal losses for the two probe fractions along the first and second interferometer paths. An attenuator, for example, can be coupled along path 203 to compensate for the loss along path 204 due to filter 212. Also, splitting/coupling ratios other than 50/50 may be selected for the couplers to compensate for different losses suffered by the two probe fractions along the interferometer paths.

To maximize contrast at the output of interference coupler 210 it is preferred to operate the interferometer in quadrature. The length of one of the interferometer arms is controlled, for example, by winding fiber 204 on a piezoceramic disk 213. The piezoceramic disk is actuated via a standard feedback circuit that senses the output of coupler 210 by a photodiode 238. For example, an integrator circuit 237 can be used for the feedback circuit. Other known ways of controlling the relative length of the interferometer arms in order to operate the interferometer in quadrature can be equivalently used.

While the beams are propagating around the "Kerr leg", the amplified drive signal of intensity I(t) modifies by the Kerr effect the fiber refraction index seen by the probe beam, which thus causes a phase shift proportional to L and I(t). As discussed in a paper by P. Boffi et al., "Analysis of the Kerr Phase-Shift Induced by Optically Amplified Transmission Signals", Optics Communications, vol. 129, Aug. 1, 1996, pages 152–60, the phase shift replicates the time behavior of the drive beam when the drive and probe beams copropagate. However, applicants have observed that the phase shift is substantially constant when the drive and probe beams counter propagate. The above is true in the case of the examples discussed in the following and whenever the modulation period $1/f_m$ of the drive beam is substantially lower than the travel time of the drive beam in the Kerr leg 205. Preferably the modulation period is smaller than one tenth of the travel time of the drive beam in the Kerr leg. If the Kerr leg has a length of 10 km, for example, the modulation frequency has to be substantially higher than about 20 kHz, and preferably higher than 200 kHz. Signals to be transmitted in optical communication systems commonly have much higher modulation frequencies, e.g. in the range of several Gbit/second for digital signals, so that the above lower limit does not represent a serious drawback. Interference of the drive and probe beams at the output coupler 210 results in a probe beam which is intensity modulated with information which was before contained in the intensity modulated drive signal. In essence, a drive signal is fed into an optical fiber where a probe beam has been split and is both copropagating and counterpropagating. The phase modulation of the copropagating probe exactly replicates in time the intensity modulation of the drive beam, while a substantially constant phase shift due to the average Kerr effect is induced in the counterpropagating probe. The two phase modulated probe fractions are caused to interfere,preferably under conditions of maximum contrast. By taking advantage of this effect, it is possible to obtain a wavelength conversion from drive signal to probe signal by using an interferometer whose arms share a nonlinear path ("Kerr leg"), e.g., a fiber coil, where the Kerr effect takes place. Also, maximum contrast of the interferometer output can be achieved by independent control of the length, loss, etc., of the optical interferometer paths which are not shared by to the two arms.

Figure 2:
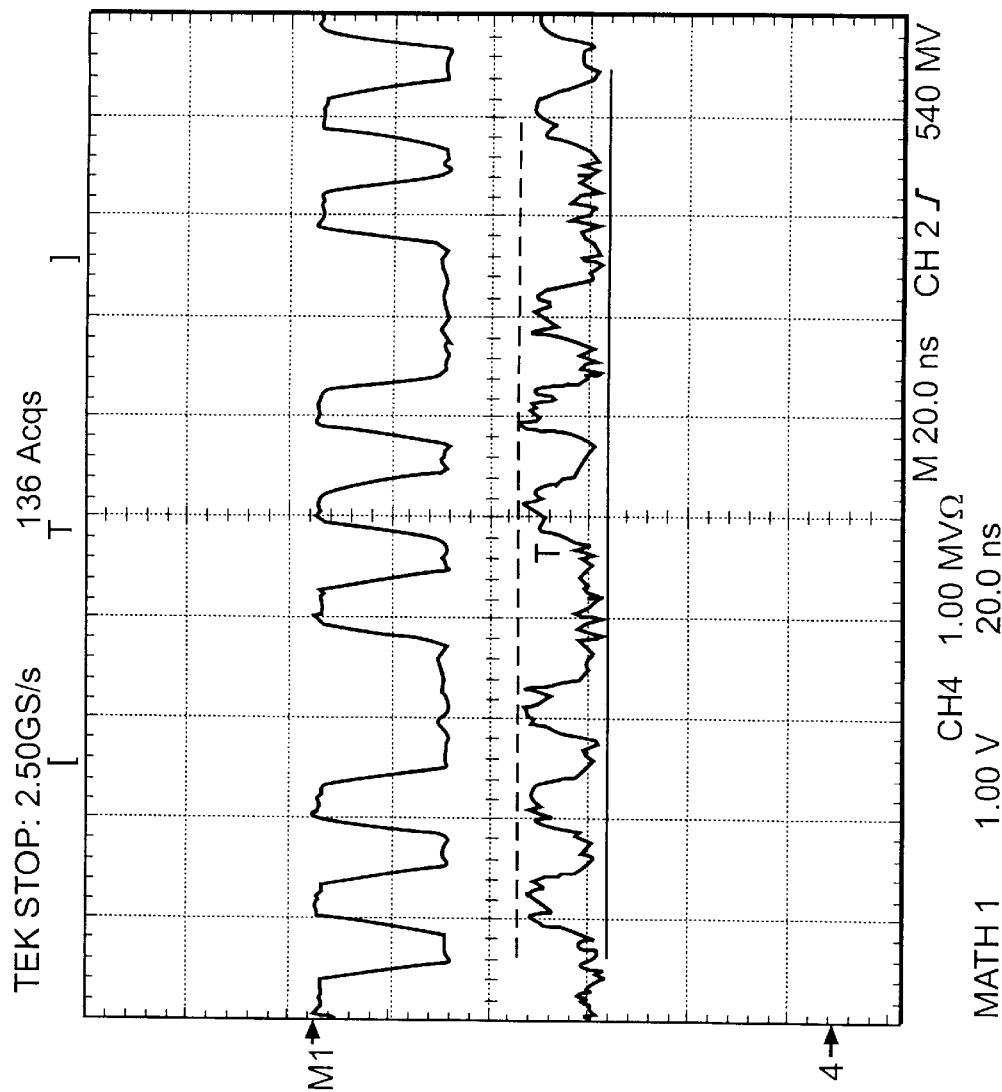
FIG. 2 is a plot of the first and second optical signal in an experiment made by applicants, showing the effect of the frequency shifter of FIG. 1.

This is illustrated in FIG. 2, where the top trace shows a drive beam used in a wavelength converter as shown in FIG. 1. The modulated drive beam was generated from an AT&T semiconductor laser operating at $\lambda_{drive}$=1540 nm. The laser was directly modulated at $f_m$=50 MHz. An input probe beam was generated by a tunable external cavity laser by New Focus. The second trace shows the intensity modulated probe beam at $\lambda_{drive}$=1530 nm at the output of the wavelength converter. Thus, in operation, an intensity modulated drive signal at a first wavelength is mixed with the co-propagating and counter-propagating probe signal of a second wavelength inside the Kerr leg 205. The co-propagating probe signal becomes phase modulated with information which was contained in the intensity modulated drive signal. At the output coupler 210, the phase modulated co-propagating probe signal is combined with the counter-propagating probe signal, which has a phase shift due to the effects of the Kerr leg 205, and an intensity modulated signal at the second wavelength is produced. As a result, the information of interest has been transferred from a 1540 nm signal to a 1530 nm signal.

Applicants have observed that the functioning of the device does not require that the probe beam fractions propagating in opposite directions in the Kerr leg 205 have equal intensities when entering the Kerr leg. In the described test setup, for example, the copropagating probe beam fraction is attenuated before entering the Kerr leg by 3 dB coupler 208, and the counterpropagating probe beam fraction is attenuated at the output of the Kerr leg. Accordingly, the asymmetric position of coupler 208 does not affect the device operation, as far as attenuation of each probe beam fraction is the same along the two interferometer arm, as above explained.

The experimental setup used to generate the traces shown in FIG. 2 was as follows. The probe beam is at 1530 nm while the drive beam is at 1540 nm. The drive beam was amplified at the EDFA saturation power of 17 dBm. All the couplers are 3 dB. All the fiber is monomodal at the wavelengths of operation. The Kerr leg consists of an 8 km dispersion shifted (DS) fiber. In the experiment the total phase shift was of about $\pi/3$, given the non-linear index of refraction of the DS fiber and the absorption coefficient which are $2.3 \cdot 10^{-20}$ m$^2$/W and 0.025 dB/km, respectively. Greater values of the total phase shift, e.g., up to $\pi$, can be achieved by properly selecting, for example, the intensity of the drive beam, the length of the Kerr leg and/or its nonlinear coefficient.

The choice of a DS fiber for the Kerr leg is not required, any other non linear medium such as optical fibers or planar waveguides can be used, requiring a different length of Kerr leg to achieve the desired nonlinear effect.

Due to dispersion, the probe and drive signals travel with different velocities in the Kerr leg. To maximize the non-linear interaction between them the relative delay between probe and drive signals after propagation in the Kerr leg is preferably less than the modulation period $1/f_m$.

The value of the preferred maximum length can be determined by the skilled in the art in each practical case taking into account the actual value of the dispersion in the Kerr leg.

The optical path length difference of the interferometer arms should be within the coherence length of the probe signal.

The coherence length of the input probe beam source was in the range of a meter in the tested setup and accordingly, the above condition was easily satisfied in practice. The condition could have been easily satisfied, however, even for probe beam sources with a much lower coherence length (in the range of centimeters, or less), by appropriately cutting the fibers used for optical paths 201–204.

The filter 212 is a tunable Fabry Perot filter with a 3 nm FWHM, which is tuned to pass the wavelength of the probe signal. Again this standard is not required and another filter with a different FWHM can be used provided that it can separate the probe and drive beams. For example, fiber gratings, interferential filters or tunable filters can be used.

The skilled in the art will select the output probe beam intensity of the wavelength converter according to the requirements of an optical communication system or optical network where the device is to be used, by correspondingly selecting the output power of the optical source that generates the probe beam. In the above test setup, the device has an overall loss of about 10 dB for the probe beam. An even lower loss is expected, e.g., by selection of specific components in the device, such as by use of a dichroic coupler for coupler 208 or by use of optical circulators for couplers 235, 236. Further than by increasing the power or the probe beam optical source and/or by decreasing the wavelength converter loss, the output probe beam intensity can be increased by optically amplifying, e.g. by an EDFA, the input probe beam or the intensity modulated output probe beam.

Applicants remark that the functioning of the device does not require specific values to be selected for the drive beam wavelength. The only conditions to be met are the availability of a drive signal of adequate power at the device input (which might require a suitable optical amplifier working at the drive beam wavelength), and of a nonlinear medium for the Kerr leg with adequate dispersion characteristics, as above indicated. Accordingly, the drive beam wavelength can be in a different spectral region than the probe beam. As an example, the drive beam can have a wavelength in the second telecommunication window (region around 1300 nm) while the probe beam is in the third telecommunication window (around 1550 nm). The opposite is also possible.

In a different series of experiments made with the previously described test setup the probe beam wavelength $\lambda_{probe}$ was tuned in the wavelength range from 1526 to 1537 and from 1543 to 1560 nm (a guard band was kept on each side of $\lambda_{drive}$=1540 nm, due to the resolution available from the Fabry Perot filter 212 that was used to separate the probe and drive beams). At each tested probe $\lambda_{probe}$ a transfer of the drive beam modulation to the probe signal was observed.

Figure 3:
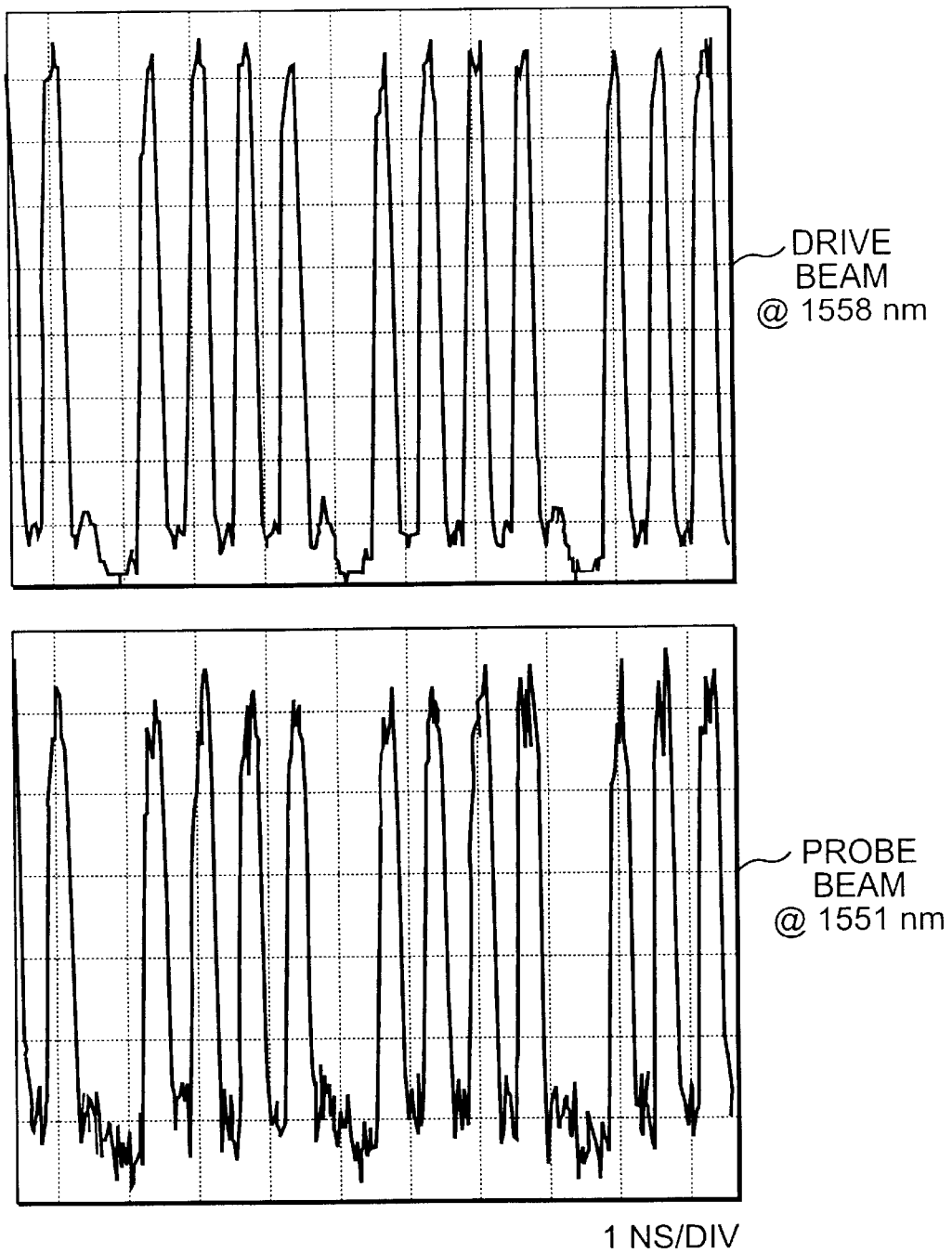
FIG. 3 is a plot of results from another experimental test of the present invention.

FIG. 3 illustrates another test on the above described system, with the following changes from the test whose results are shown in FIG. 2. For the FIG. 3 test, the drive beam used had a wavelength of 1558 nm, and the probe beam had a wavelength of 1551 nm. The drive beam source was a 1558 nm DFB laser diode by Mitsubishi. The drive beam was amplified to a power of 17 dBm by EDFA 206 before being input into the converter. The probe beam source was a 1551 DFB laser diode by Fujitsu. The drive beam was modulated at 3 Gbit/second by a test non-return-to-zero pattern corresponding to the binary sequence 1010101000 and the pattern was reproduced in the intensity of the output probe beam. As FIG. 3 shows, the invention was operative to shift the wavelength of a signal modulated at 3 Gbit/second. Due to the Kerr effect characteristics, the inventors believe that this invention may be useful for modulation frequencies up to at least 1 Terabit/second.

The wavelength converter of the invention has separated paths for the modulation beam (201, 204) and for the reference beam (202, 203), together with an optical path (comprising the Kerr leg 205) which is common to both the reference and modulation beams. In a practical embodiment of the device, the length of paths 201–204 is much smaller than the length of the Kerr leg.

Comparing the above described wavelength converter to the commonly known Mach Zehnder configuration, in which the reference and the modulation beam have physically different paths, the proposed architecture is innovative because the reference and modulation beams substantially share the same path in which they counterpropagate. Thus the converter is particularly insensitive to common mode noise, e.g., of acoustical and environmental origin. This type of noise, which is mainly generated in the Kerr leg due to its greater length and which was a problem in prior art devices, affects by equal amounts the reference and modulation beams, and is suppressed at the output by the interference of the two beams. An even greater improved insensitivity to environmental and acoustic noise is achieved by integrating, in total or in part, the optical paths 201–204, the couplers/splitters, the polarization controllers, the filter and the path length control element in a common substrate, e.g., by a suitable planar optics waveguide technology.

The invention described above and in the following discussion has also the advantage of being wavelength independent (or easily tunable, depending on the selection of coupler 208 and of filter 212, as above explained). Its wavelength of operation depends on the wavelength of the signals input, as opposed to the architecture of the converter itself. In other words, by selecting the wavelength of the drive and probe signals properly, one can use the same converter circuit to operate at different wavelengths. This is highly advantageous in the field of fiber optic communication devices.

Figure 4:
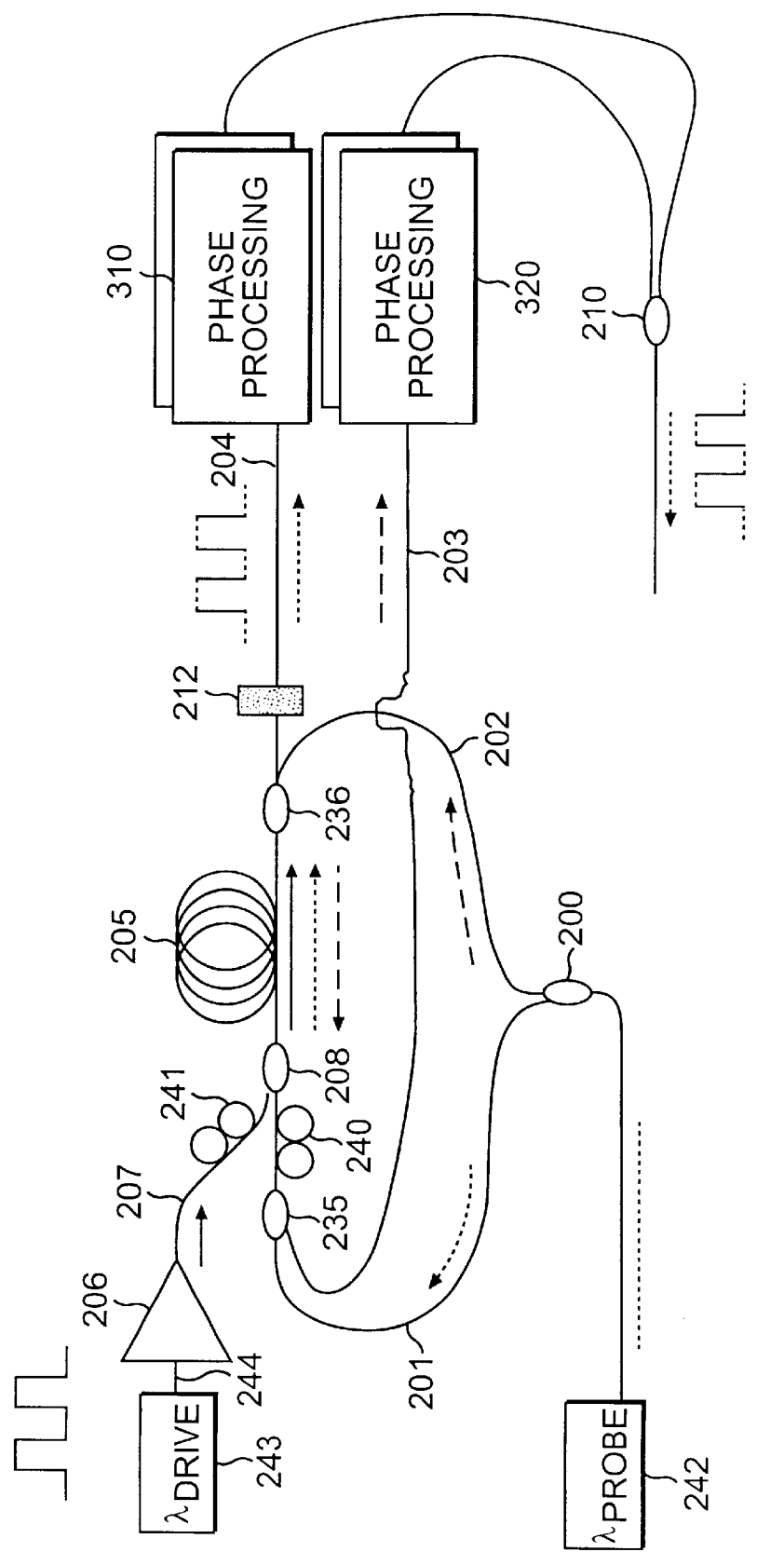
FIG. 4 is a diagram of a second embodiment of the present invention.

A second embodiment of the wavelength converter of this invention is presented in FIG. 4, where identical elements bear identical reference numbers as in FIG. 1. Because of their propagations along the "Kerr leg", the two beams into which the input probe beam is split (via the input 3 dB coupler) experience a phase shift induced by the amplified modulated drive signal. The copropagating-phase reproduces in time the intensity of the drive signal to be converted, while the counterpropagating phase is substantially constant.

In this embodiment, phase optical processing on the copropagating part of the probe beam is made before it is combined with, and undergoes the effects of, interference with the counterpropagating probe beam, whose phase acts as reference at the output coupler 210. Similar or different processing can be made on the reference phase (the counterpropagating phase). The phase processing on the converted beam in the phase domain (not yet intensity modulated) before it is applied to the output coupler 210 can consist of any optical processing that modulates or otherwise changes the phase of the beams, for instance via electrooptic modulators, via holographic gratings, or via a delay due to an optically-controlled nonlinear medium. These processing steps are represented generally by phase processing units 310 and 320.

Figure 5:
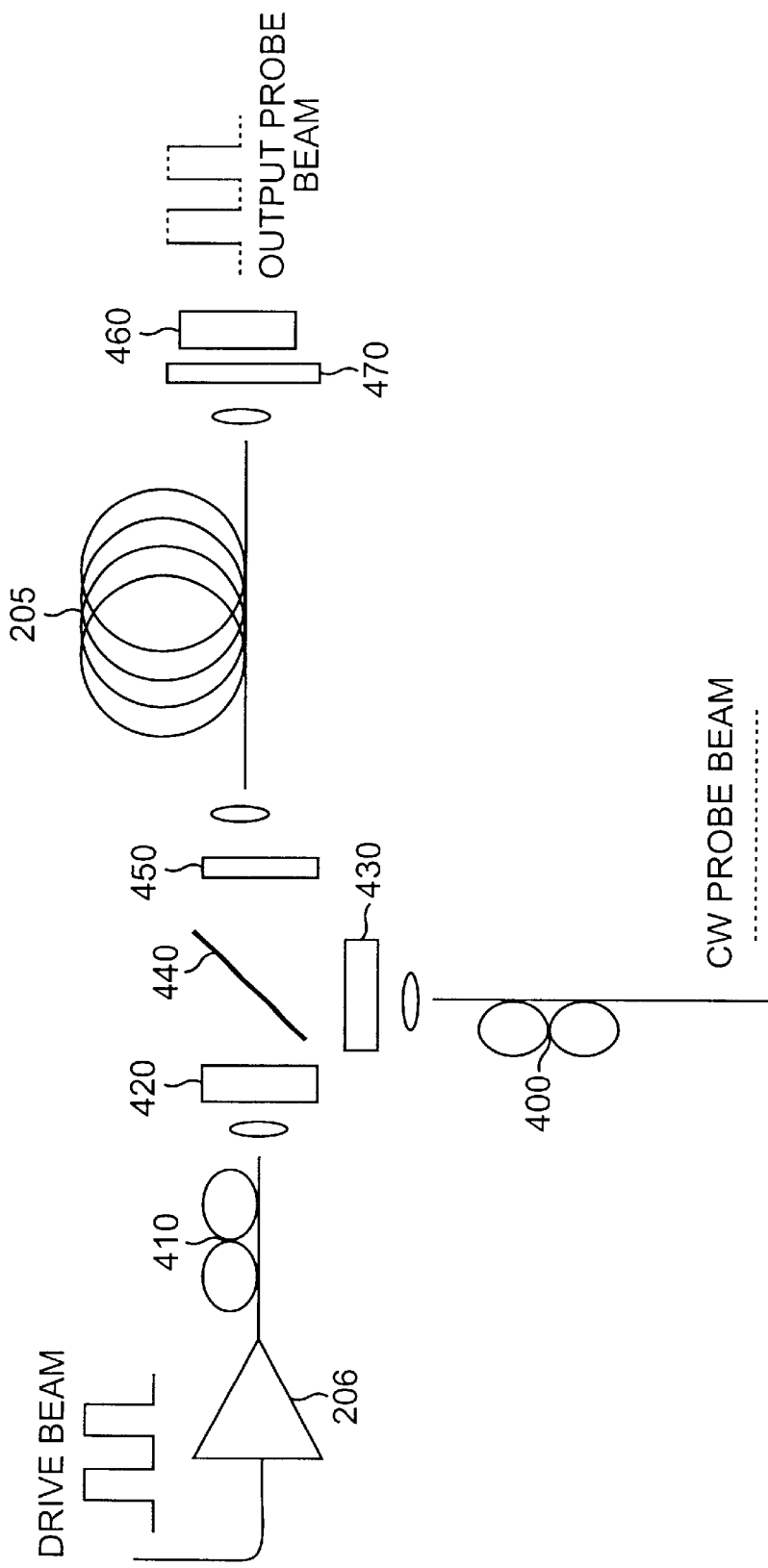
FIG. 5 is a diagram of a third embodiment of the present invention.

FIG. 5 shows yet another embodiment of the present invention. In this embodiment, two polarization controllers 400, 410 and two polarizers, 420 and 430, are rotated so that the drive and probe beams have linear states of polarization forming an angle of 45°. Via the dichroic mirror 440, both probe and drive signals are coupled into the Kerr leg 205. The dichroic mirror 440 transmits $\lambda_{drove}$ and reflects $\lambda_{probe}$. Before entering the Kerr leg and after the dichroic mirror, both pump and drive signals pass through a half-wave plate 450 whose function is to rotate the state of polarization of the two beams so that the drive beam polarization can match one of the birefringence axes of the fiber. Birefringence is induced because of the coiling of the fiber in the Kerr leg 205.

In practice, birefringence $\delta\beta/\beta$ of a coiled fiber is less than about $3.7 \cdot 10^{-5}$, and preferably less than $1.5 \cdot 10^{-6}$, as known to the skilled in the art, e.g., from the reference book "Single-mode fiber optics", by L. B. Jeunhomme, Marcel Dekker Inc., 1990, pp. 74–75.

A coiled DS fiber is preferably used for the Kerr leg 205.

At the Kerr leg 205 input, the situation can be viewed as if there were three optical beams: the drive beam with a given state of polarization, half the probe beam with polarization parallel to the polarization of the drive beam, the other half probe beam with polarization orthogonal to the drive beam.

The two half probes propagate together with the drive into the Kerr leg 205, thus experiencing a nonlinear phase shift due to the Kerr effect. This phase shift replicates in time the intensity modulation of the drive signal, yet because of their different state of polarization the value of this shift is different for the two probes, being three times greater for the probe with polarization parallel to the drive.

To obtain interference at the end of the interferometer, the two probes must recombine. This is achieved via an output polarizer 460, whose polarization axis is oriented as that of polarizer 430, and forms an angle of 45° with both the probes' polarizations. When the two probe signals recombine, interference is obtained and the phase modulation is transformed into intensity modulation. A filter 470, e.g., an interferential filter is used to separate the drive beam from the probe beam before they enter the output polarizer 460 so that only the latter is output.

Figure 6:
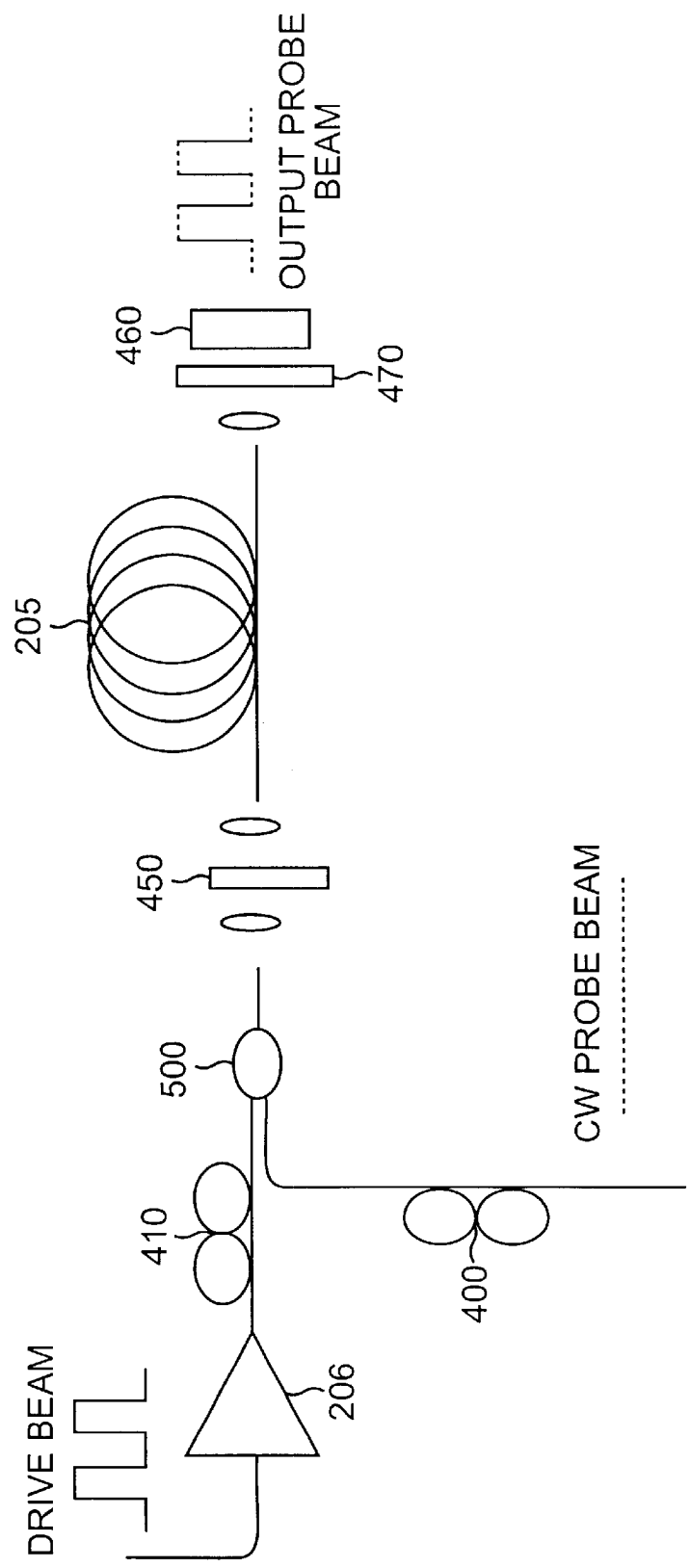
FIG. 6 is a diagram of a fourth embodiment of the present invention.

Another embodiment of the invention is disclosed in FIG. 6. This embodiment differs only in the way drive and probe beams enter the nonlinear medium. A polarization maintaining coupler 500 is used to couple the two signals while maintaining their states of polarization. This coupler preserves the initially fixed states of polarization of the two beams (45° angle between them). The advantage offered by this design is the ease with which both beams are collimated into the Kerr leg (as they have the same cross-section, are output by the same fiber in the same condition, and are optimally superposed at the input of half-wave plate 450).

Figure 7:
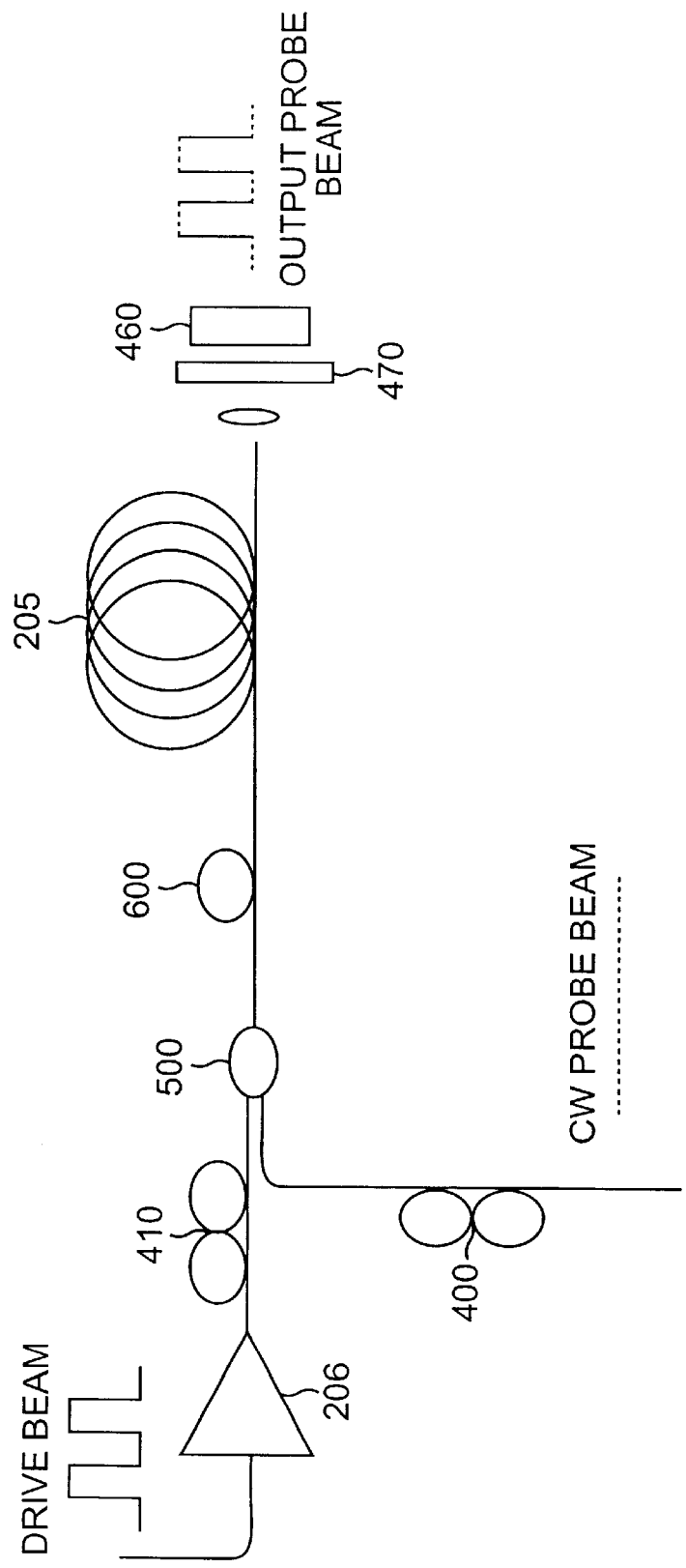
FIG. 7 is a diagram of a fifth embodiment of the present invention.

FIG. 7 illustrates another embodiment of the invention. After exiting the polarization maintaining coupler 500, the two beams (probe and drive with a defined state of polarization) do not exit the fiber but instead pass through a fiber loop 600 of appropriate length and bending radius whose function is the same as the half wave plate 450. This solution does not require the beams to exit the fiber, and thus lowers losses.

Figure 8:
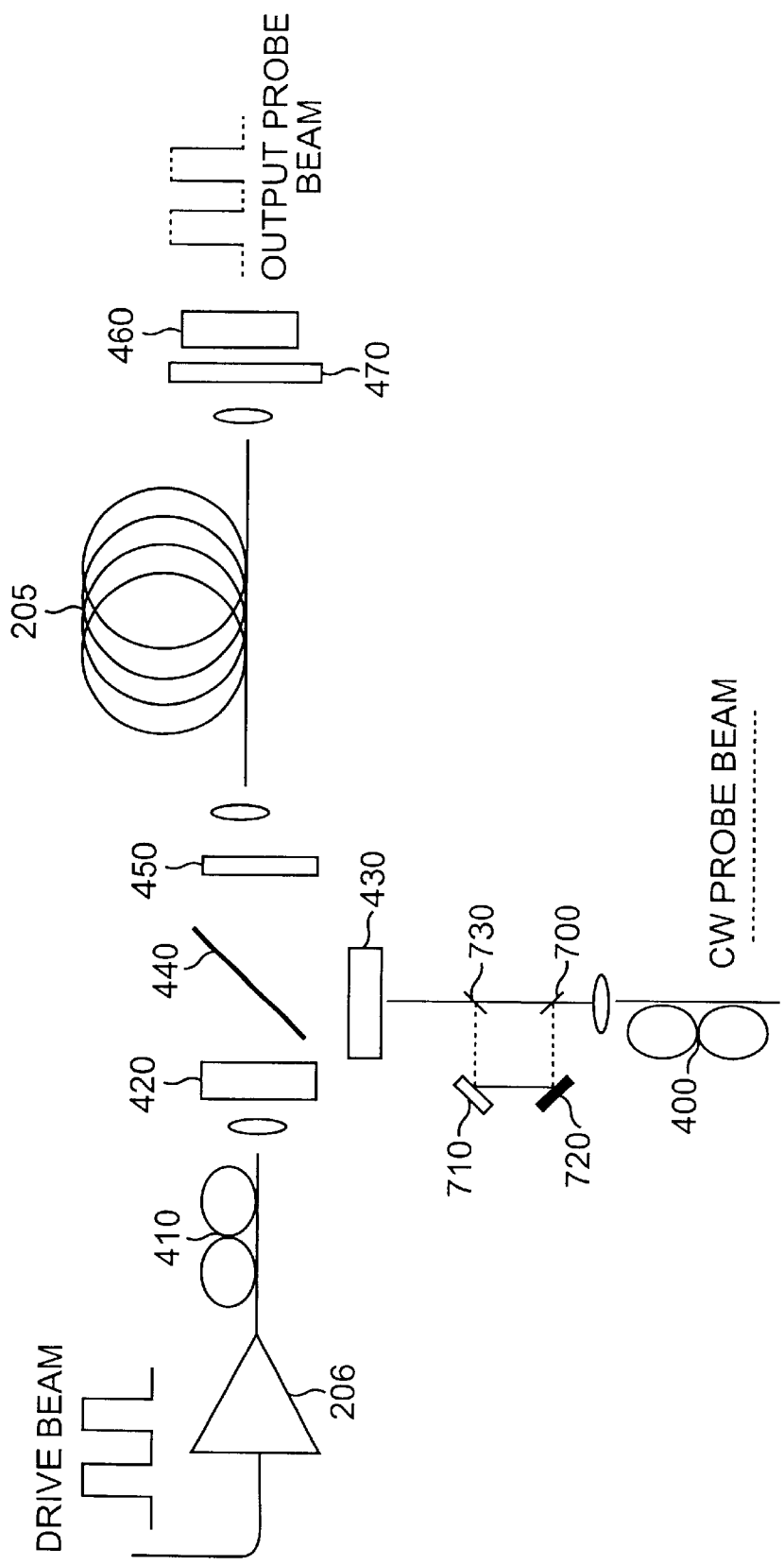
FIG. 8 is a diagram of a sixth embodiment of the present invention.

FIG. 8 illustrates one method to stabilize the interferometer working point which is applicable to any of the embodiments shown in FIG. 5, 6 or 7. The probe beam is split along two independent paths corresponding to two different states of polarization, parallel and orthogonal to the drive beam state of polarization, via a polarization beam splitter 700. This gives the chance to change the working point of the interferometer by varying the path of one of the two polarizations via a piezo actuated mirror 710 and a second mirror 720. The two polarization components of the probe are then remixed via another polarization beam splitter 730. Accordingly, the interferometer can be operated in quadrature by a standard feedback circuit of the type of that previously described in relation to FIG. 1.

What is claimed is:

1. A wavelength converter for transferring information from a first signal of one wavelength to a second signal of a second wavelength, comprising:

an optical path formed by a length of optical fiber which contains a Kerr leg;

a first optical coupler for receiving a first optical signal and splitting that signal into two components, so that one component travels in a first direction around the optical path and a second component travels in a second direction around the optical path, opposite to the first direction;

a second optical coupler for receiving a second optical signal which is intensity modulated with information and supplying that signal to the optical path in one of said first or second direction, so that the second optical signal and the first and second components of the first optical signal interact in the Kerr leg of the optical path;

third and fourth optical couplers for coupling the optical signals moving in the optical path to a first and second output optical path, respectively; and an output coupler for combining the two components of the first optical signal and generating an output optical signal which has the wavelength of the first optical signal and is intensity modulated with the information contained in the second optical signal.

2. A wavelength converter as in claim 1, further comprising a feed back circuit to adjust the length of one of said first or second output optical paths so that the interference between the first and second components of the first optical signal at the output coupler is maximized.

3. A wavelength converter as in claim 1, wherein at least one component of the first optical signal is phase processed by a phase processing unit prior to the output coupler.

4. A wavelength converter as in claim 1, further comprising an optical filter prior to the output coupler for filtering the second optical signal.

5. A method for transferring information from a first optical beam to a second optical beam, comprising:

splitting the second beam into two portions, and causing the two portions to travel in opposite directions through an optical path containing a Kerr leg;

causing the first beam to travel in one of said opposite directions through the optical path containing the Kerr leg;

coupling the two portions of the second beam out of the optical path along a second and a third optical path; and combining the two portions of the second beam along said second and third optical paths to create interference between them.

6. The method of claim 5, further comprising the step of filtering the first beam at the output of the optical path.

7. Optical telecommunication system comprising a transmitter for generating a first optical signal at a first wavelength which is intensity modulated with information;

a first optical link operating at said first wavelength, coupled to said transmitter;

a second optical link operating at a second wavelength;

a wavelength converter connecting said first and second optical links, wherein said wavelength converter comprises:

an optical path formed by a length of optical fiber which contains a Kerr leg;

a first optical coupler for receiving a second optical signal at said second wavelength and splitting that signal into two components, so that one component travels in a first direction around the optical path and a second component travels in a second direction around the optical path, opposite to the first direction;

a second optical coupler for receiving said first signal and supplying it to the optical path in one of said first or second directions, so that the first optical signal and the first and second components of the second optical signal interact in the Kerr leg of the optical path;

third and fourth optical couplers for coupling the optical signals moving in the optical path to a first and second output optical path, respectively, and an output coupler for combining the two components of the second optical signal, generating an output optical signal which has the second wavelength and is intensity modulated with the information contained in the first optical signal, and for coupling said output optical signal to said second optical link.

* * * * *